United States Patent [19]
Nakao

[11] Patent Number: 6,023,350
[45] Date of Patent: Feb. 8, 2000

[54] IMAGE READING DEVICE FOR PHOTOGRAPHIC PRINTING

[75] Inventor: Hiroto Nakao, Wakayama, Japan

[73] Assignee: Noritsu Koki Co., Ltd., Wakayama, Japan

[21] Appl. No.: 08/551,140

[22] Filed: Oct. 31, 1995

[30] Foreign Application Priority Data

Nov. 4, 1994 [JP] Japan ................................. 6-271257

[51] Int. Cl.$^7$ ....................................................... H04N 1/46
[52] U.S. Cl. ........................... 358/512; 358/515; 358/518; 358/483; 250/226
[58] Field of Search .................................... 358/512, 505, 358/500, 515, 518, 516, 517, 513; 355/38, 68, 77, 35, 71, 228; 250/237, 280.1, 226; 348/273, 277

[56] References Cited

U.S. PATENT DOCUMENTS

| | | | |
|---|---|---|---|
| 4,355,349 | 10/1982 | Simons et al. | 362/153 |
| 4,466,725 | 8/1984 | Hirohata | 354/403 |
| 4,670,779 | 6/1987 | Nagano | 358/512 |
| 4,713,683 | 12/1987 | Fujimori et al. | 358/512 |
| 4,725,729 | 2/1988 | Morizumi | 250/237 |
| 4,786,964 | 11/1988 | Plummer et al. | 358/512 |
| 4,807,026 | 2/1989 | Nishioka et al. | 348/70 |
| 4,809,198 | 2/1989 | Terashita . | |
| 4,933,779 | 6/1990 | Milch | 358/489 |
| 4,942,424 | 7/1990 | Terashita et al. | 355/38 |
| 5,033,821 | 7/1991 | Hama et al. | 350/315 |
| 5,075,768 | 12/1991 | Wirtz et al. | 358/496 |
| 5,227,845 | 7/1993 | Hiranuma et al. | 355/228 |
| 5,235,399 | 8/1993 | Usui et al. | 356/45 |
| 5,337,164 | 8/1994 | Yabe et al. | 358/461 |
| 5,414,535 | 5/1995 | Kanmoto et al. | 358/464 |
| 5,703,700 | 12/1997 | Birgmeir et al. | 358/475 |

FOREIGN PATENT DOCUMENTS

| | | |
|---|---|---|
| 21-50830 | 6/1990 | Japan . |
| 50-63894 | 3/1993 | Japan . |
| 62-50298 | 9/1994 | Japan . |

Primary Examiner—Edward L. Coles
Assistant Examiner—Mark Wallerson
Attorney, Agent, or Firm—Armstrong, Westerman, Hattori, McLeland & Naughton

[57] ABSTRACT

An image reading device for photographic printing comprising an optical lens mechanism, a monochrome CCD image device arranged at a focal position on an optical axis of the optical lens mechanism, a filter rotation plate having a plurality of color filters rotatably arranged on the optical axis, and a cut filter for blocking unnecessary light arranged on the optical axis, wherein a light quantity correction means for obtaining stepwise spectral characteristics is arranged on the optical axis. The reflected light due to the conventional ND coating and the influences of the boundary plane and the parallel degree between the cut filter and the color filter are disappeared, whereby the occurrence of flare, ghost and color divergence can be prevented.

11 Claims, 11 Drawing Sheets

IMAGE READING DEVICE FOR PHOTOGRAPHIC PRINTING

BACKGROUND OF THE INVENTION

The present invention relates to an image reading device for photographic printing in the photo-processing apparatus. More particularly, the present invention relates to an image reading device for photographic printing for reading the color image stored in the film by the CCD image element.

In the printing device for printing the color image stored in the developed film onto a photosensitive material, the image reading device for photographic printing for reading the color image is used. As this image reading device for photographic printing, there are two kinds of devices, the one using the color CCD image element (hereinafter referred to as "color CCD") and the other using the monochrome CCD color element (hereinafter referred to as "monochrome CCD") to convert it to the color image by the color filter (spectral filter).

Figure 10:
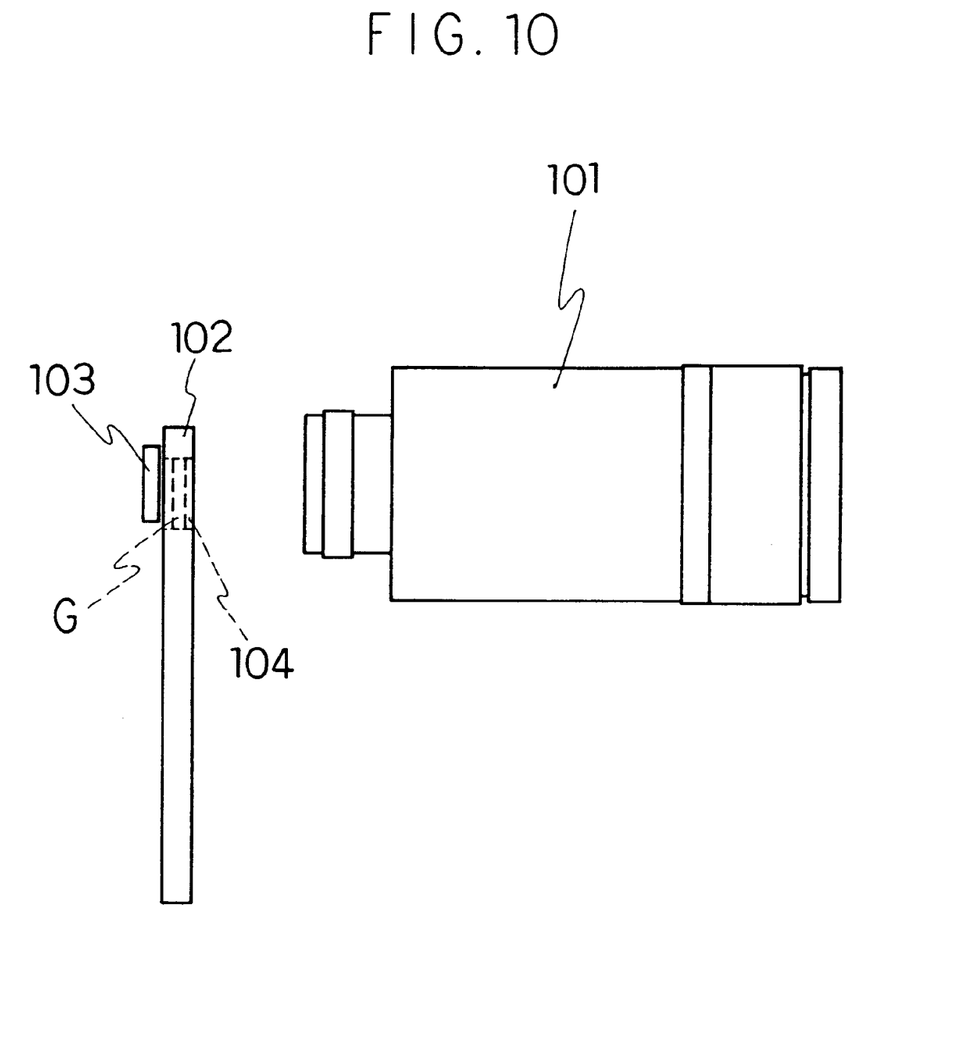
FIG. 10 is an elevational view showing the conventional image reading device for photographic printing.
Figure 11:
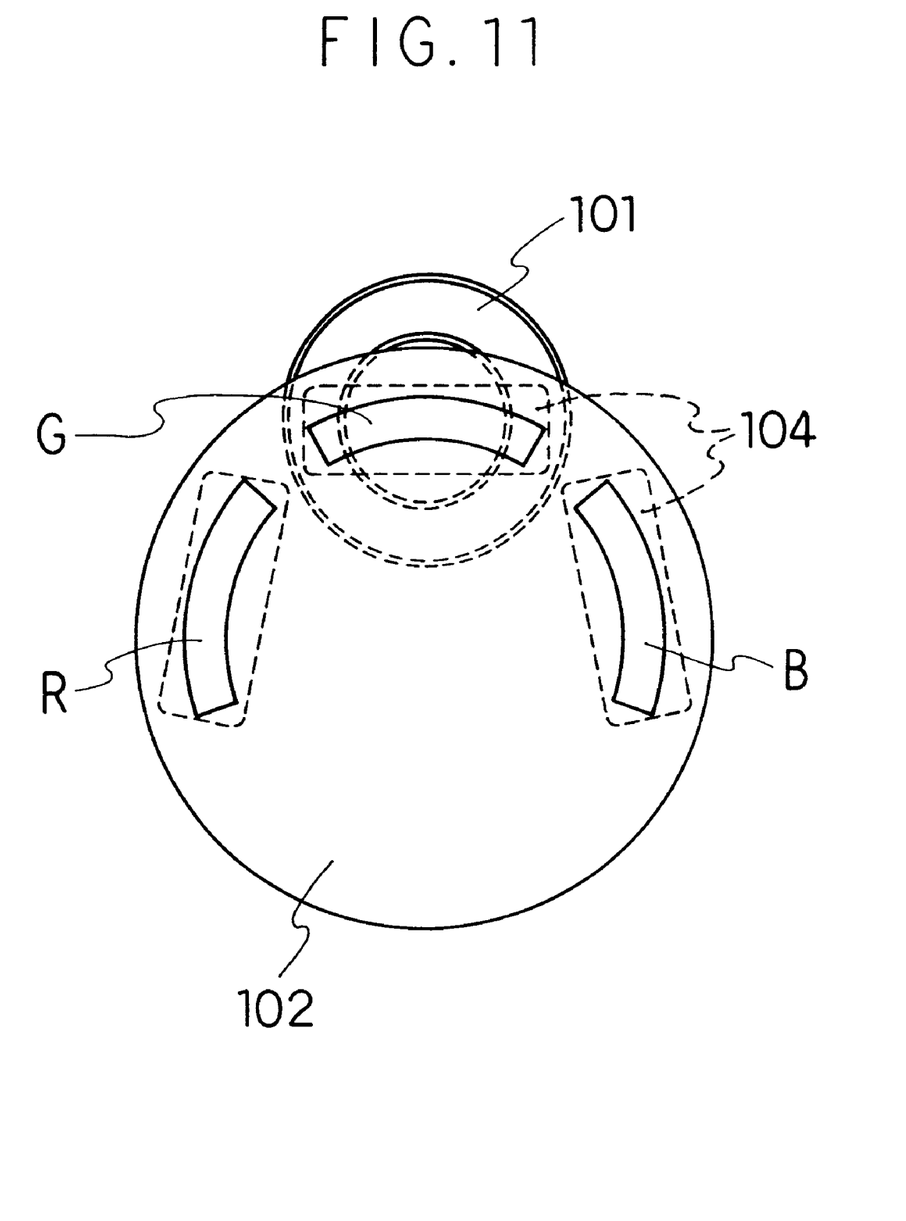
FIG. 11 is a left side view of the image reading device for photographic printing in FIG. 10.

The device using the color CCD is generally not used because the spectral characteristics do not match against the sensitive material (paper sensitivity) in the photo devices (printer). On the contrary, the device using the monochrome CCD is, as shown in FIG. 10 and FIG. 11, composed of an optical lens mechanism 101 comprising a zoom lens arranged opposite to the film; a filter rotation disk 102 having color filters, a blue filter B, a green filter G and a red filter R, coaxially in the peripheral direction thereof; and a monochrome CCD 103. Since the light voltage of the respective filters B, G and R is strong in the order of filters R, G and B, the light quantity of respective filters B, G and R is balanced by applying dark ND (Neutral Density) coating to the filter R to restrict the transmitting light quantity and ND coating thinner than that to the filter G, with making the light voltage of the filter B as a reference. Thus, the device using the monochrome CCD has been generally used, since it can obtain necessary spectral characteristics freely by combining color filters.

However, since the film of the ND coating becomes a strong reflection surface, the reflected light on the surface of the monochrome CCD 103 is sometimes reflected by the film of the ND coating to be incident over the monochrome CCD 103. In such a case, there is a problem that a phenomenon to degrade the contrast of the imaging plane of the monochrome CCD 103 (hereinafter referred to as a "flare") tends to be caused. There is further a problem that the light reflected in several times on the surface of the zoom lens reaches the film surface to generate an image being out of focus other than the regular image (hereinafter referred to as a "ghost") tends to be generated. Furthermore, since cut filters 104 for removing the ultraviolet rays and infrared rays are sticked to the color filters of respective filters B, G and R, other than respective spectral transmission films, the boundary plane to be sticked is likely to be the reflection surface, and the parallel degree of the sticked two filters is deteriorated due to the error of adhesive precision, so that the parallel degrees of respective filters B, G and R against the monochrome CCD 103 becomes non-uniform, which causes a problem that color divergence is likely to be caused.

The present invention has been completed under the above background. It is therefore a primary object of the present invention to provide an image reading device for photographic printing which can prevent the occurrence of the flare, ghost and color divergence and can obtain a clear color image.

SUMMARY OF THE INVENTION

In accordance with the first invention, there is provided an image reading device for photographic printing comprising an optical lens mechanism, a monochrome CCD image device arranged at a focal position on an optical axis of the optical lens mechanism, a filter rotation plate having a plurality of color filters rotatably arranged on the optical axis, and a cut filter for blocking unnecessary light arranged on the optical axis, wherein a light quantity correction means for obtaining stepwise spectral characteristics is arranged on the optical axis.

Furthermore, in accordance with the second invention, there is provided an image reading device for photographic printing comprising an optical lens mechanism, a monochrome CCD image device arranged at a focal position on an optical axis of the optical lens mechanism, a filter rotation plate rotatably arranged on the optical axis and having a plurality of color filters, on a surface of which ND coating is applied to restrict transmitting light quantity, and a cut filter for blocking unnecessary light arranged on the optical axis, wherein the filter rotation plate is tilted against the optical axis.

According to the image reading device for photographic printing of the first invention, by arranging the light quantity correction means having stepwise spectral characteristics on the optical axis instead of the ND coating applied to the color filters G and R, and by synthesizing the light quantity correction means and the cut filter, the reflected light due to the ND coating and the influences of the boundary plane and the parallel degrees of the cut filter and the color filter are disappeared, whereby the occurrence of flare, ghost and color divergence can be prevented. Furthermore, by tilting at least one of the cut filter and light quantity correction means against the optical axis, the reflected light from the image-sensing plane of the monochrome CCD is not reflected to be incident over the image-sensing plane, flare, ghost and color divergence can be further prevented.

Furthermore, according to the image reading device for photographic printing of the second invention, only by tilting the conventional rotation plate against the optical axis, the reflected light cannot be incident over the image-sensing plane of the monochrome CCD, and flare and ghost can be prevented better than the conventional devices.

DETAILED DESCRIPTION

Next, the image reading device for photographic printing of the present invention is explained based on the accompanying drawings.

Figure 1:
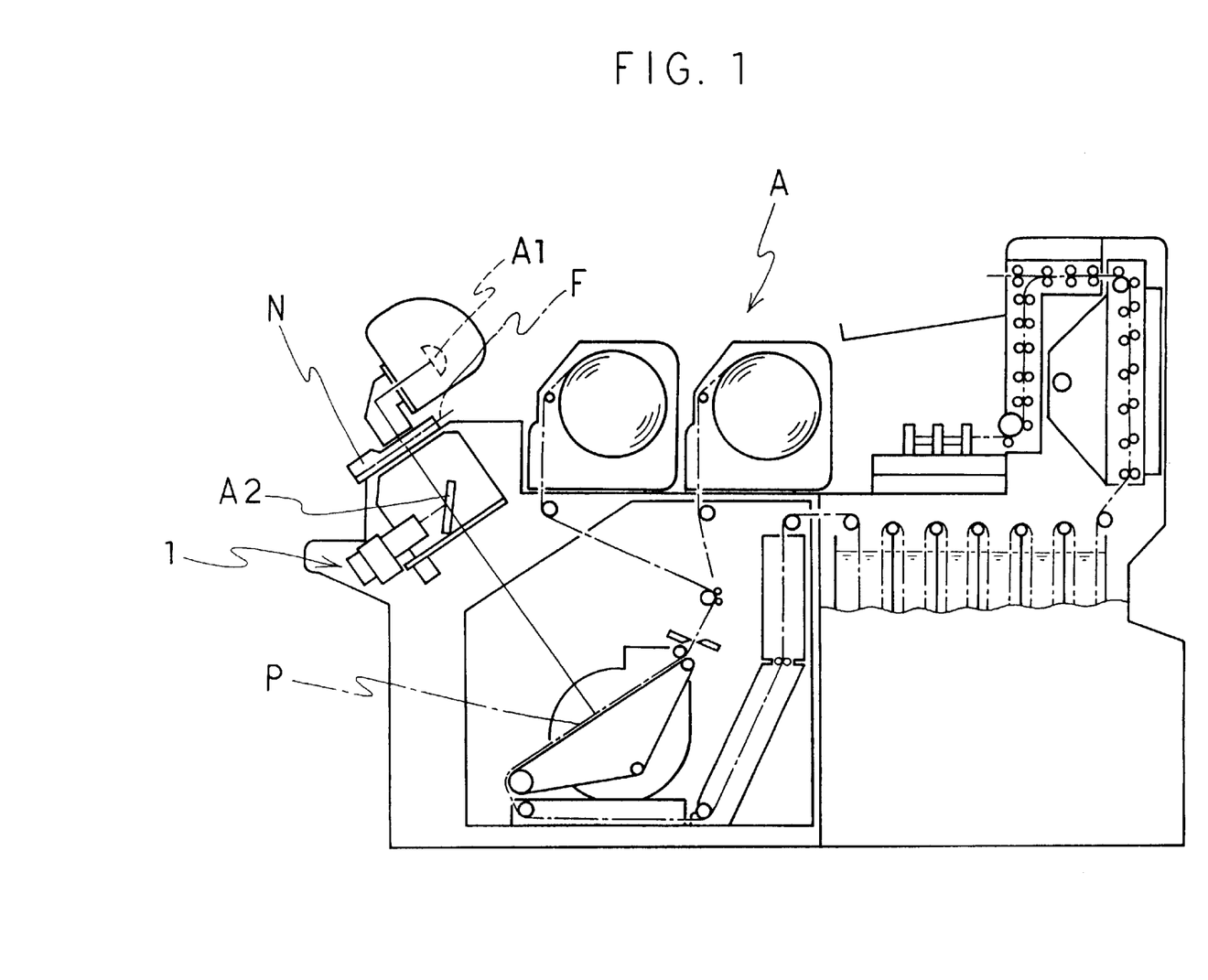
FIG. 1 is a schematic view of a photographic printing device which adopts an image reading device for photographic printing of the present invention.

As shown in FIG. 1, the photographic printing device A which adopts the image reading device for photographic printing of the present invention receives the light irradiated from a light source A1 via a mirror A2, reads the color image stored in the film F fed out from the negative mask N by the image reading device for the photographic printing, and based on the read image informations, performs printing to a photosensitive material P.

Figure 2:
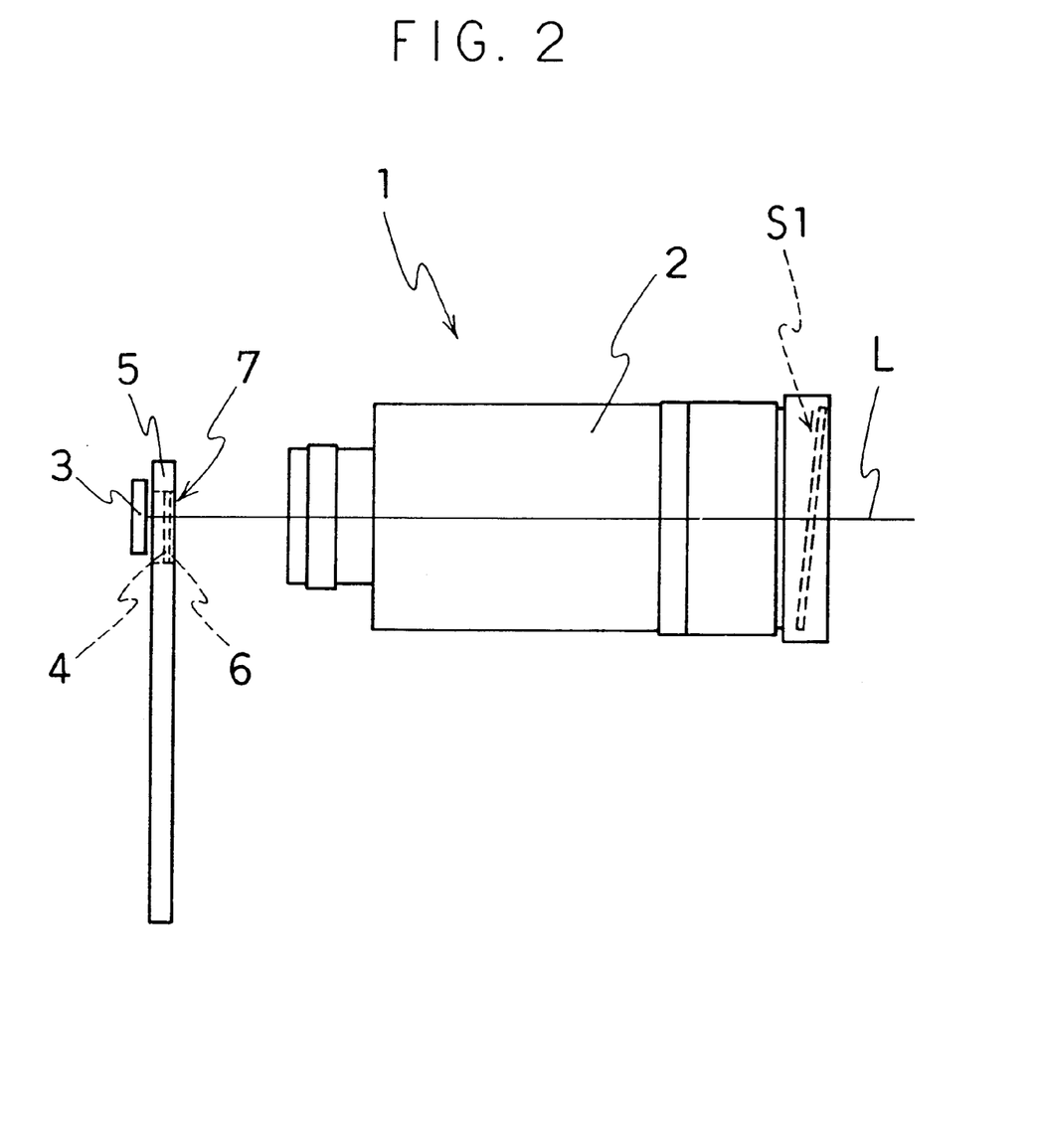
FIG. 2 is an elevational view showing one embodiment of the image reading device for photographic printing according to the first invention.
Figure 3:
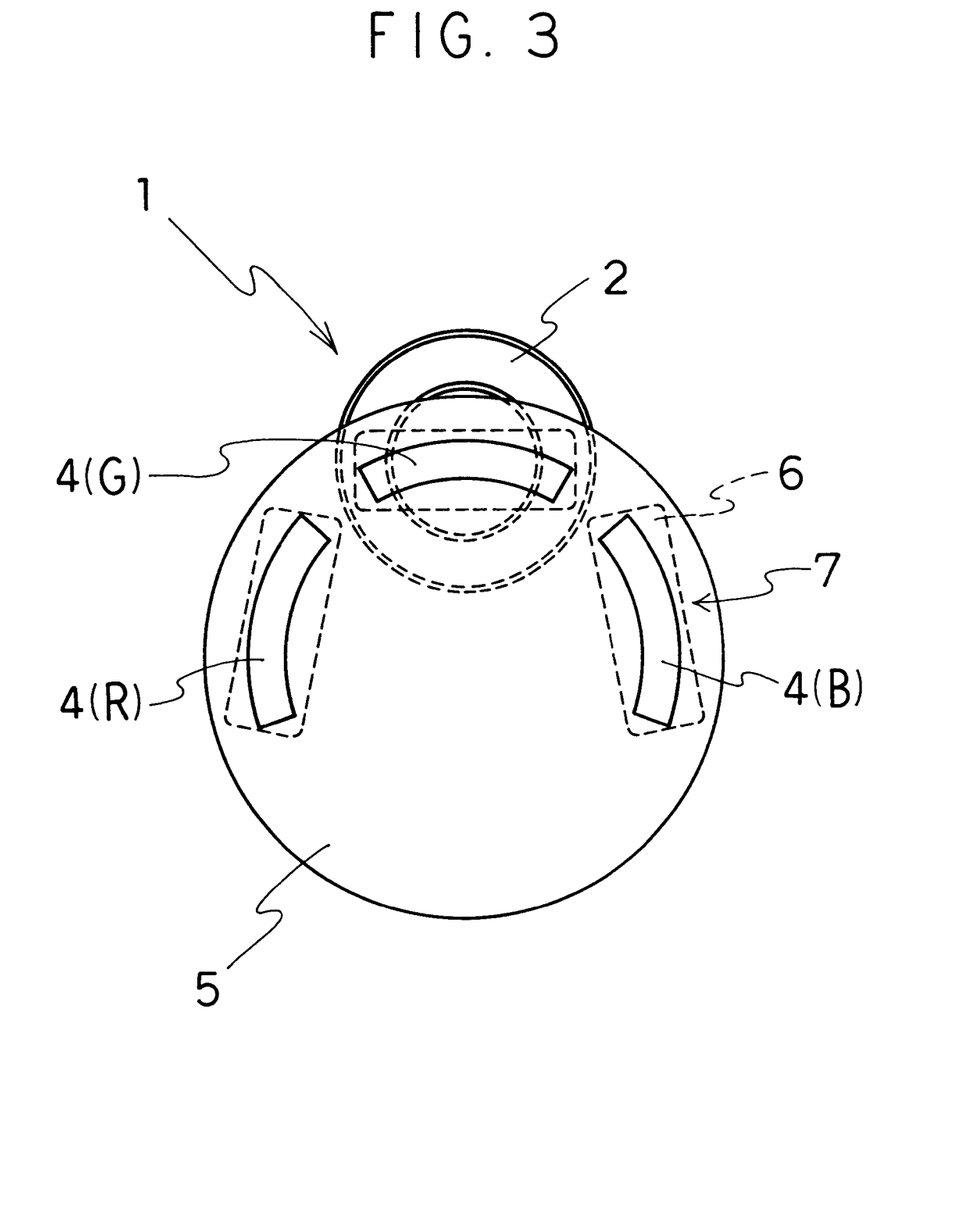
FIG. 3 is a left side view of the image reading device for photographic printing in FIG. 2.

As shown in FIGS. 2 and 3, the image reading device for photographic printing 1 according to the first invention comprises an optical lens mechanism 2, a monochrome CCD 3 arranged at a focal position of an optical axis L of the optical lens mechanism 2, a filter rotation plate (hereinafter referred to as "rotation plate") 5 having a plurality of color filters 4 rotatably arranged on the optical axis L, and a cut filter 6 for blocking unnecessary light arranged on the optical axis L.

The optical lens mechanism 2 is composed of, for example, a group of zoom lenses for enlarging the image stored in the film F.

As the monochrome CCD 3, for example, an inter line type CCD solid-state image sensing device can be used, though not particularly limited in the present invention.

The rotation plate 5 is in a disk-like form and the respective color filters 4 are housed in the rectangular holes 7 formed in the coaxial positions in the peripheral direction. The color filters 4 are blue filter B, green filter G and red filter R in order. As the driving device of the rotation plate 5, there can be used known motors, for example, a stepping motor and the like. In addition, differing from the conventional filters G and R, the ND coating for restricting the amount of transmitting light is not applied to the filters G and R.

The cut filter 6 is a filter to which coating is applied to remove the ultraviolet rays and the infrared rays affecting the light quantity balance of the respective filters B, G and R.

The image reading device for photographic printing according to the first invention has a characteristic that a light quantity correction means S1 is arranged in front of the rotation plate 5 (on the right side of FIG. 2).

Figure 4:
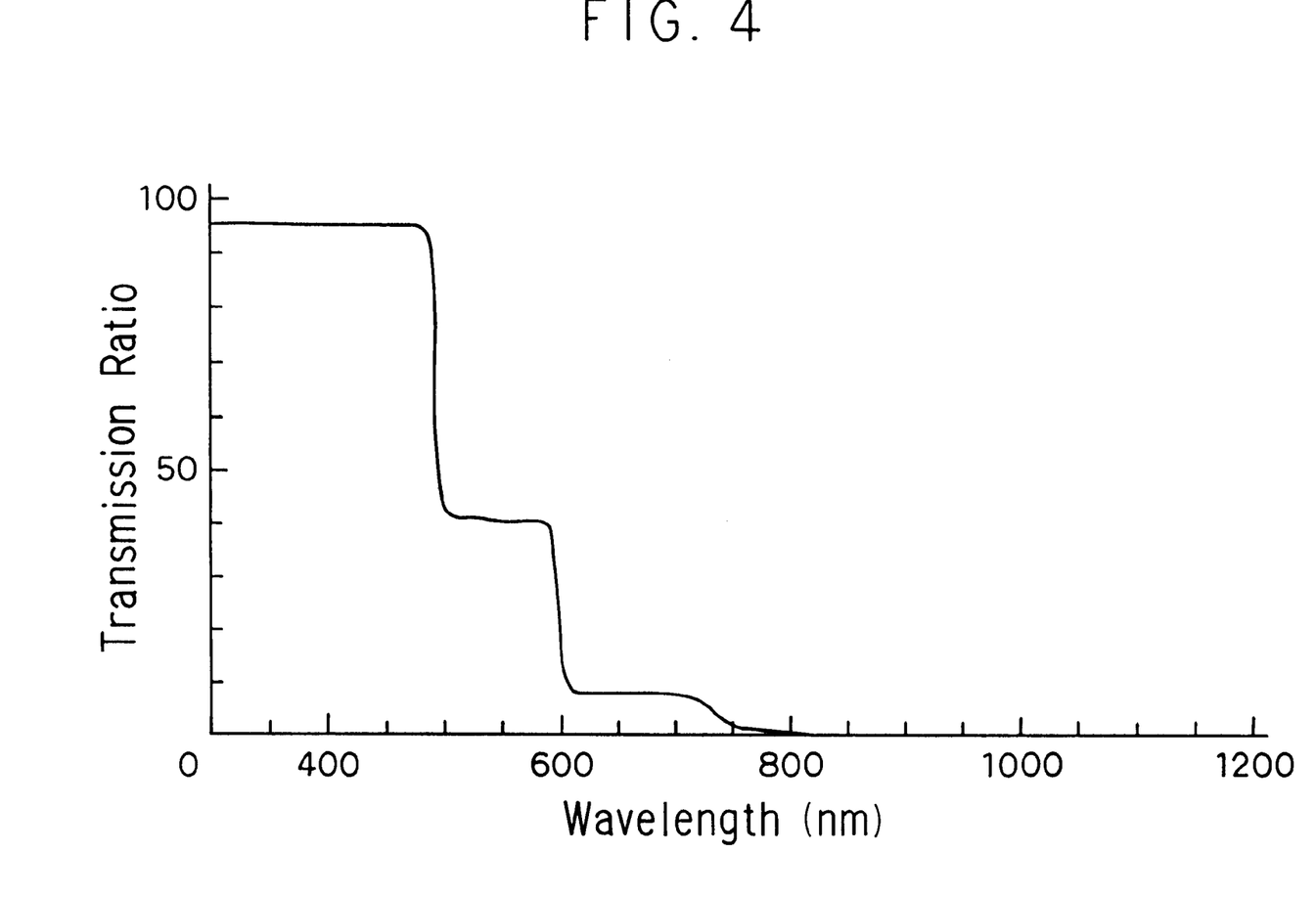
FIG. 4 is a spectral characteristic curve of the light quantity correction means in FIG. 2.
Figure 5:
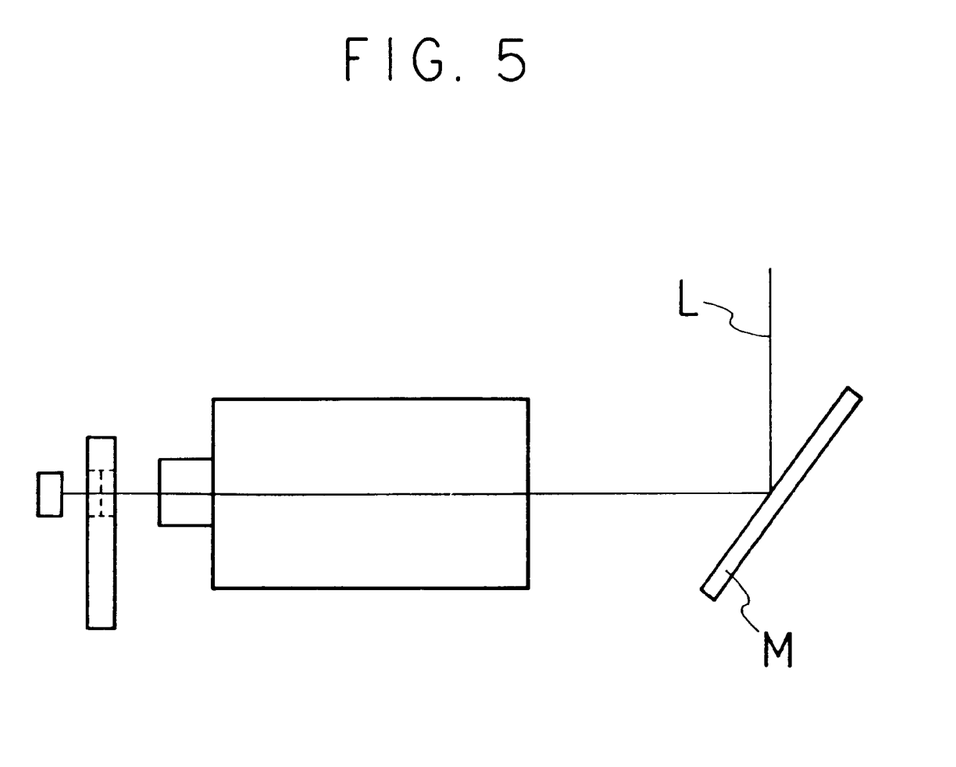
FIG. 5 is an elevational view showing another embodiment of the light quantity correction means in FIG. 2.

The light quantity correction means S1 is, in the present embodiment, based in a front portion of the optical lens mechanism 2. This light quantity correction means S1 is arranged so that stepwise spectral characteristics can be obtained, as shown in FIG. 4, while different ND coating is conventionally applied to the filters G and R, respectively, in order to obtain the sensitivity balance of the monochrome CCD by respective filters B, G and R. Thereby, necessary spectral sensitivity can be obtained as a whole. Namely, the light quantity correction means S1 is such a means that a plurality of metal oxide films which balance the light quantity of the filters B, G and R are combined to be coated on the surface of a color balance filter comprising a transparent glass to obtain the stepwise spectral characteristics. Also, as the light quantity correction means S1, as shown in FIG. 5, a color balance mirror M for obtaining the stepwise reflective spectral characteristics as shown in FIG. 4 might be used on the optical axis L, instead of the mirror A2 shown in FIG. 1. On the surface of this color balance mirror M, coating is applied by combining a plurality of metal oxide films as described above. By using the color balance mirror M, the constituent part can be made simpler than the case where the color balance is taken by filters.

In the present embodiment, flares can be reduced by arranging the light quantity correction means S1 in front of the optical lens mechanism 2.

Furthermore, the light quantity correction means S1 is attached with being tilted by 5° or so against the optical axis L. Thereby, it can be prevented that the reflected light on the plane of the monochrome CCD 3 reflects again to enter into the CCD 3, whereby no ghost is caused. Incidentally, in the present invention, the tilt angle of the color balance filter is made to be 5°, but it is not limited thereto, and can be properly selected in the range of, for example, from 5 to 10°, according to the image sensing area. Moreover, the tilt direction is not particularly limited.

Next, another embodiment of the image reading device for photographic printing according to the first invention will be described.

Figure 6:
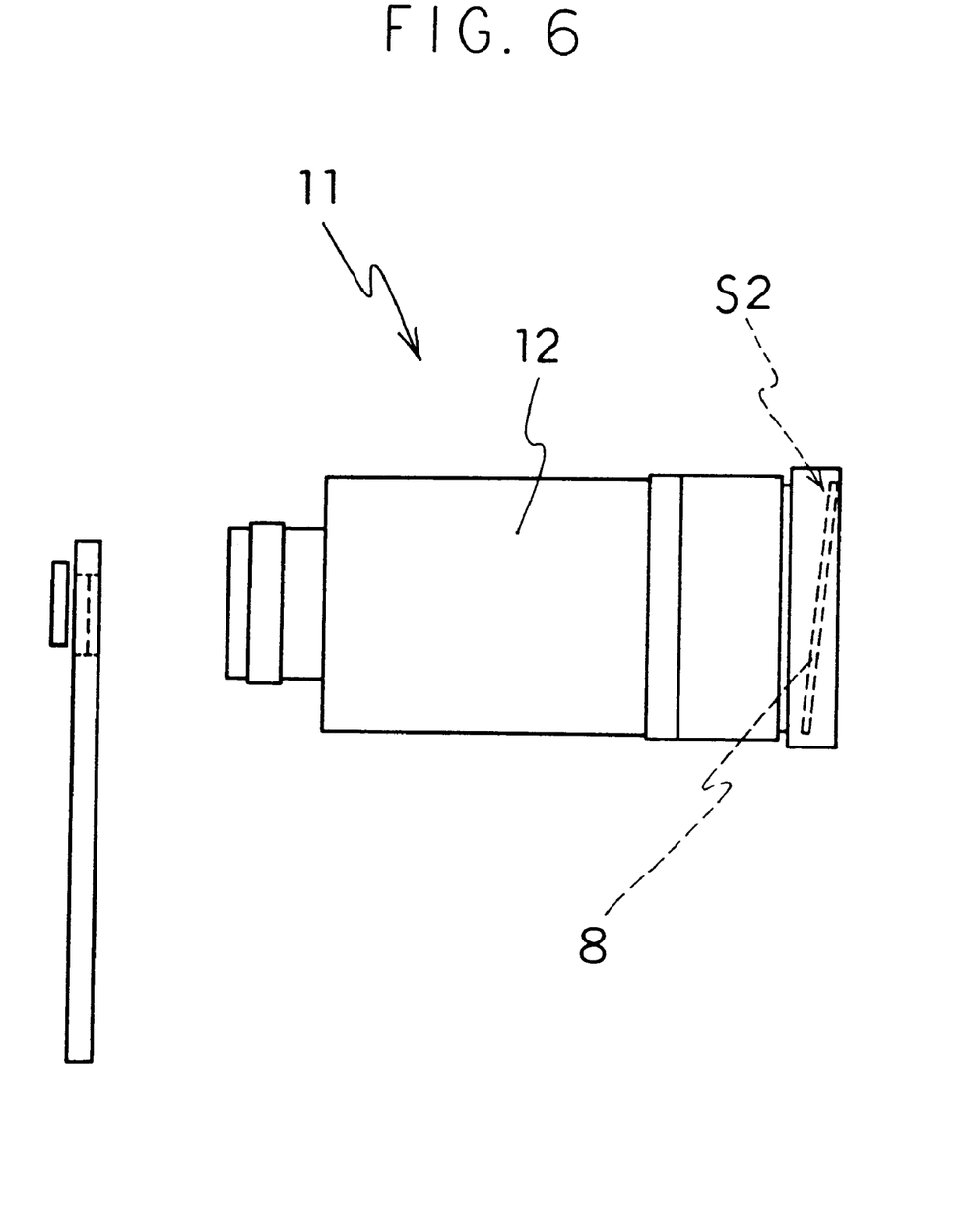
FIG. 6 is an elevational view showing another embodiment of the image reading device for photographic printing according to the first invention.

As shown in FIG. 6, the image reading device for photographic printing 11 has a light quantity correction means S2 different from the light quantity correction means S1 in the image reading device for photographic printing 1 in that the cut filter 6 and the light quantity correction means S1 are synthesized to make one filter. Namely, in the light quantity correction means S2 of the present embodiment, the coating to balance the light quantity of the respective filters B, G and R and the coating to remove the ultraviolet rays and infrared rays are applied on the back face and on the surface of one color balance filter 8, respectively. Moreover, this color balance filter 8 is also arranged in front of the optical lens mechanism 12 and tilted by about 5° against the optical axis L, as described above.

Incidentally, in the light quantity correction means S2 of the present invention, one sheet of color balance filter 8 integrally composed of the cut filter and the color balance filter is used, however, in the present invention, it is not particularly limited thereto, and one cut filter 6 and a light quantity correction means S1 can be provided in parallel to be synthesized.

The image reading device for photographic printing 11 of the present embodiment is not so affected by the parallel degree of respective filters B, G and R and the cut filter 6 compared to the image reading device for photographic printing 1, thereby flares and the like can be further prevented. Furthermore, by integrally synthesizing the cut filter and the color balance filter, the number of parts can be reduced to make the image reading device compact.

Next, further another embodiment of the image reading device for photographic printing according to the first invention will be described.

Figure 7:
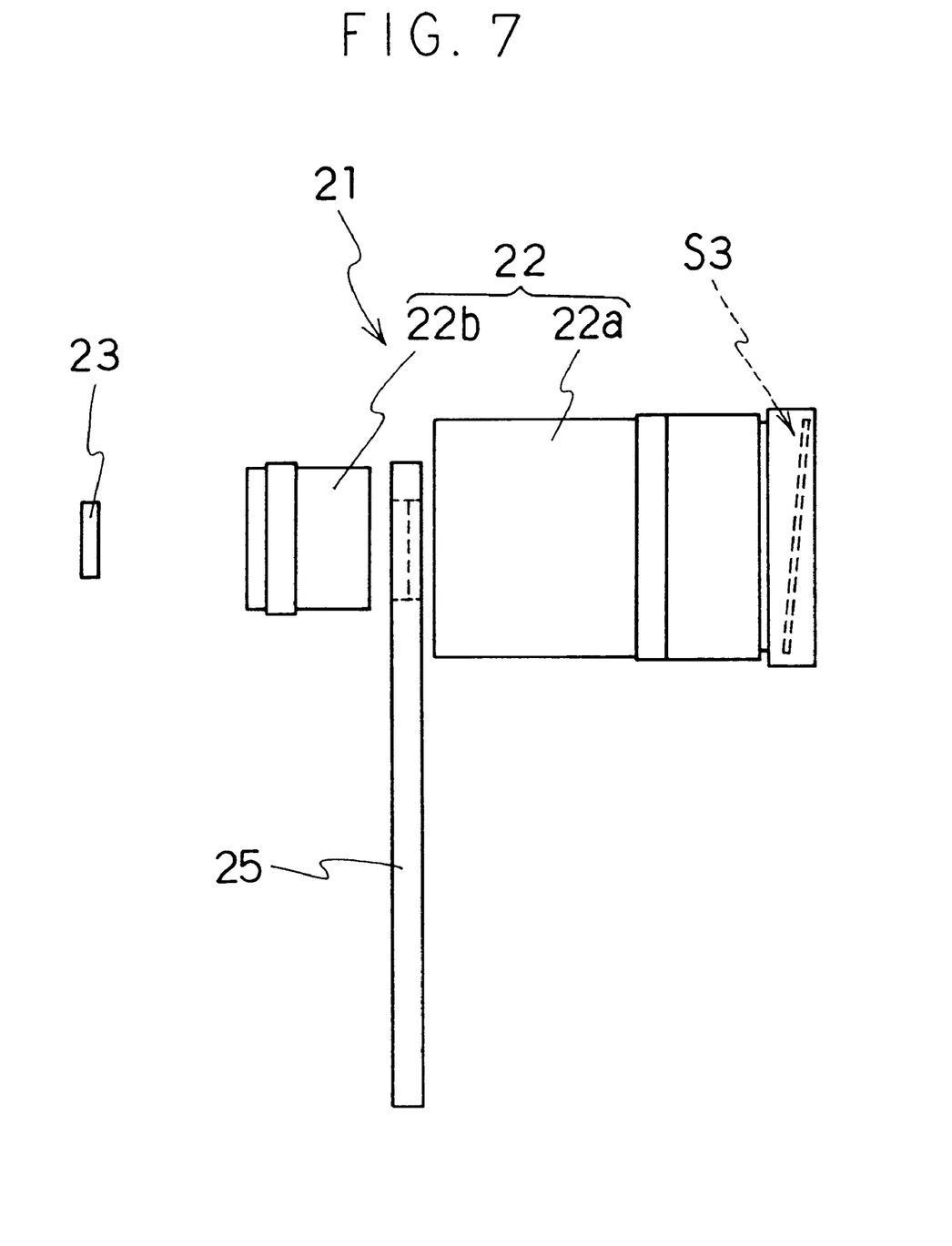
FIG. 7 is an elevational view showing still another embodiment of the image reading device for photographic printing.

As shown in FIG. 7, the image reading device for photographic printing 21 is different from the image reading device for photographic printing 11 in that a rotation plate 25 is arranged between the lens group of the optical lens mechanism 22.

The optical lens mechanism 22 is divided into the first lens mechanism 22a and the second lens mechanism 22b. The light quantity correction means S3 is arranged in front of the first lens mechanism 22a.

The light quantity correction means S3 can integrally synthesize the cut filter and the color balance filter, or synthesize them in parallel, as in the light quantity correction means S2 in the image reading device for photographic printing 11. Furthermore, at least one of the rotation plate 25 and the light quantity correction means S3 can be tilted against the optical axis.

The image reading device for photographic printing 21 of the present embodiment has a rotation plate 25 arranged between the lens group of the optical lens mechanism 22. Therefore, the reflected light from the image sensing plane of the monochrome CCD 23 is not parallel beam, whereby the reflected light is not reflected again on the monochrome CCD 23. As a result, occurrence of flares and ghosts can be prevented.

Next, still another embodiment of the image reading device for photographic printing according to the first invention will be described.

Figure 8:
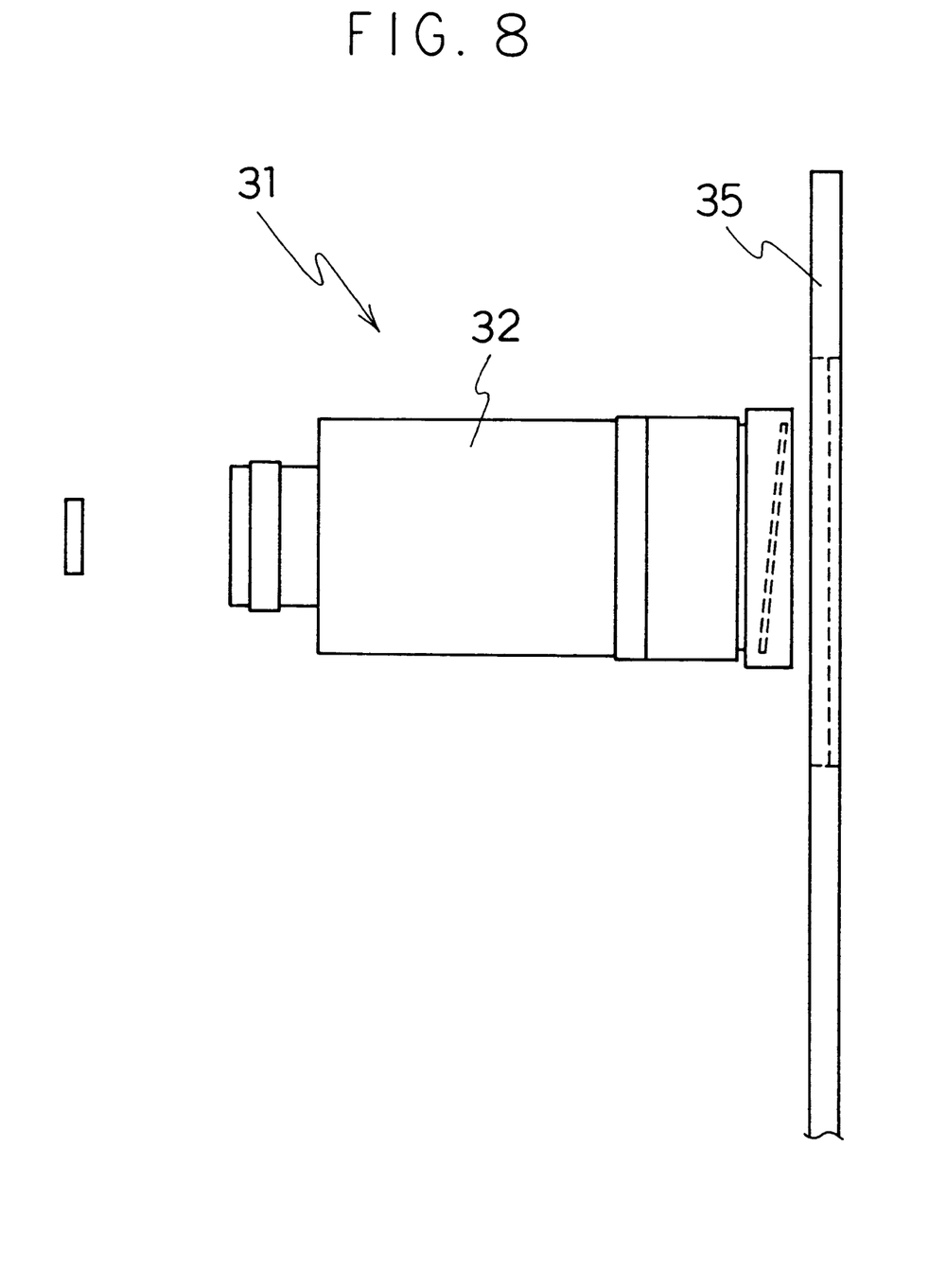
FIG. 8 is an elevational view showing yet another embodiment of the image reading device for photographic printing according to the first invention.

As shown in FIG. 8, the image reading device for photographic printing 31 is different from the image reading device for photographic printing 11 in that the rotation plate 35 is arranged at a position ahead of the optical lens mechanism 32, and other points are identical with the image reading device for photographic printing 11. In addition, the position to be arranged of the rotation plate 35 is not particularly limited in the present invention. Since the device is made compact, however, it is desired that the rotation plate should be arranged at a position apart from the optical lens mechanism 32 by, for example, 3 to 10 mm.

Next, one embodiment of the image reading device for photographic printing according to the second invention will be described.

Figure 9:
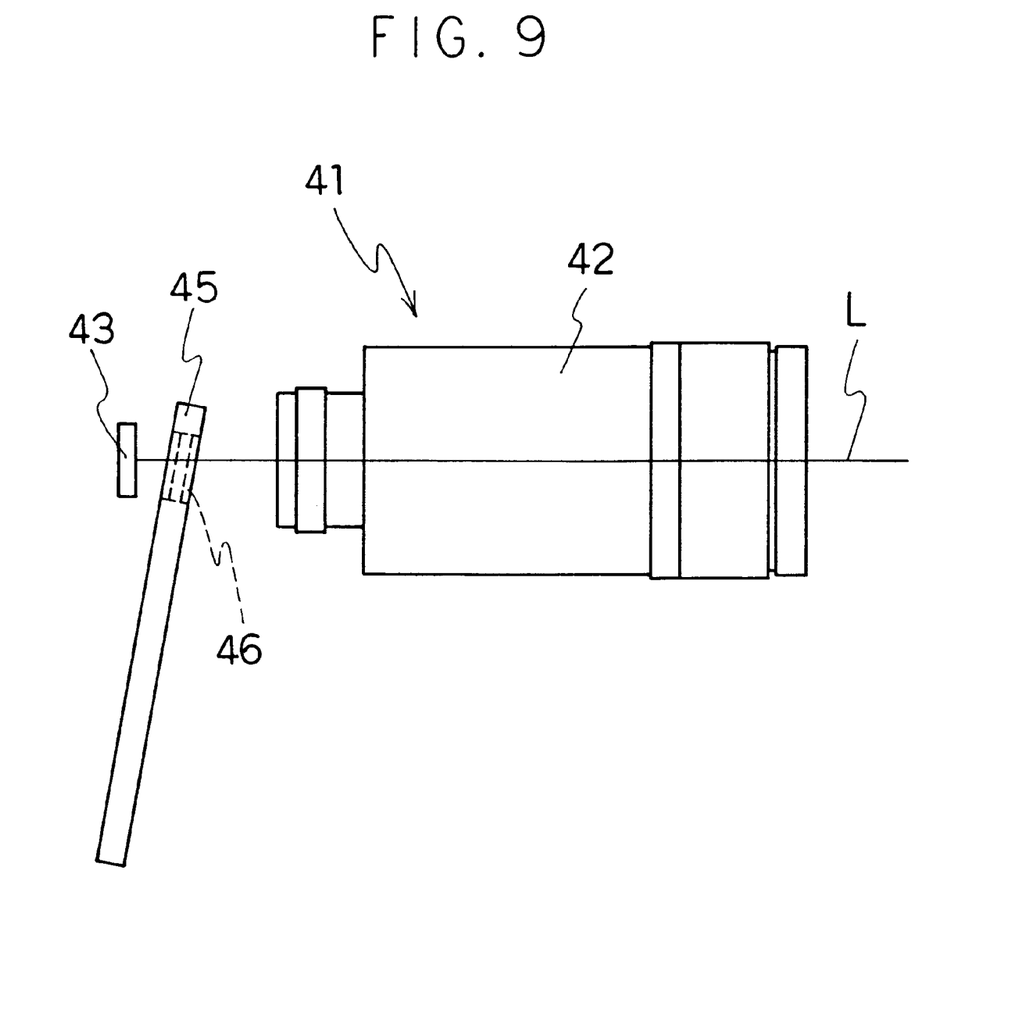
FIG. 9 is an elevational view showing one embodiment of the image reading device for photographic printing according to the second invention.

As shown in FIG. 9, the image reading device for photographic printing 41 is different in that the rotation plate in the conventional image reading device for photographic printing is arranged with being tilted against the optical axis L.

The tilt angle against said optical axis L is not particularly limited in the present invention, and it can be about 1 to 45°, preferably 5 to 10°.

In the present embodiment, by tilting the rotation plate 45, even if the reflected light from the image sensing plane of the monochrome CCD 43 is reflected on the planes of the respective tilted filters B, G and R, the reflected light is reflected toward outside of the image sensing plane of the monochrome CCD 43, whereby any flares and ghosts are not caused at all. Furthermore, in the present embodiment, the cut filter 46 is separated from the rotation plate 45 and arranged so as to be tilted in front of the optical lens mechanism 42, whereby the occurrence of the color divergence can be prevented.

Incidentally, the image reading device for photographic printing in the present invention is used to be mounted on the photographic printing device which reads the spectral data of the color image which is stored in the film and incident from the optical lens mechanism and respective filters B, G and R by rotating the rotor plate, then calculates the exposure conditions based on the data, and prints the image on the photosensitive material according to the conditions. Therefore, this printing device can obtain clear prints, while preventing flares, ghosts and the color divergence by the image reading device for photographic printing in the present invention.

As described above, according to the image reading device for photographic printing of the first invention, by arranging the light quantity correction means having stepwise spectral characteristics on the optical axis, and by synthesizing the light quantity correction means and the cut filter, the reflected light due to the conventional ND coating and the influences of the boundary plane and the parallel degree between the cut filter and the color filter are eliminated, whereby the occurrence of flare, ghost and color divergence can be prevented. Furthermore, by tilting at least one of the cut filter and light quantity correction means against the optical axis, it is prevented that the reflected light from the image sensing plane of the monochrome CCD is reflected to be incident over the image sensing plane, whereby the occurrence of flare, ghost and color divergence can be further prevented. Furthermore, by integrally synthesizing the light quantity correction means and cut filter, the number of parts can be reduced to make the image reading device compact.

Furthermore, according to the image reading device for photographic printing of the second embodiment of the present invention, only by tilting the conventional rotation plate against the optical axis, flare and ghost can be further prevented compared to the conventional device. Furthermore, by separating the cut filter from the rotor plate, arranging it to the optical lens mechanism, and tilting it against the optical axis, the occurrence of the color divergence can be further prevented.

Though several embodiments of the present invention are descrived above, it is to be understood that the present invention is not limited only to the above-mentioned and various changes and modifications might be made in the invention without departing from the spirit and scope thereof.

What is claimed is:

1. An image reading device for photographic printing of an image, comprising:
    an optical lens mechanism;
    a monochrome CCD image device, arranged at a focal position on an optical axis of the optical lens mechanism, sensing spectral characteristics of the image projected onto said monochrome CCD by said optical lens mechanism;
    a filter rotation plate having a plurality of color filters rotatably arranged on the optical axis;
    a cut filter blocking unnecessary light, arranged on the optical axis; and
    light quantity correction means for obtaining stepwise spectral characteristics by balancing a light quantity of said color filters to achieve a sensitivity balance of said monochrome CCD, arranged on the optical axis,
    wherein exposure conditions for the photographic printing of the image are determined based on the spectral characteristics of the image sensed by said monochrome CCD after the sensitivity balance is achieved by said light quantity correction means and by said cut filter blocking the unnecessary light.

2. The device of claim 1, wherein the light quantity correction means is housed within the optical lens mechanism.

3. The device of any one of claims 1 to 2, wherein the light quantity correction means is a color balance filter in which coating for restricting an amount of transmitting light is applied to a surface of the color balance filter.

4. The device of claim 1, wherein the light quantity correction means is a color balance mirror in which coating for restricting an amount of transmitting light is applied to a surface of the color balance mirror.

5. The device of any one of claims 1 to 2, wherein the light quantity correction means and the cut filter are synthesized.

6. The device of any one of claims 1 to 2, wherein the filter rotation plate is disposed in the optical lens mechanism.

7. The device of any one of claims 1 to 2, the filter rotation plate is disposed in front of the optical lens mechanism.

8. The device of any one of claims 1 to 2, wherein at least one of the light quantity correction means and the cut filter is tilted against the optical axis.

9. An image reading device for photographic printing of an image, comprising:

an optical lens mechanism;

a monochrome CCD image device, arranged at a focal position on an optical axis of the optical lens mechanism, sensing spectral characteristics of the image projected onto said monochrome CCD by said optical lens mechanism;

a filter rotation plate rotatable and tilted on the optical axis, having a plurality of color filters with a ND coating on a surface to restrict transmitting light quantity; and a cut filter blocking unnecessary light, arranged on the optical axis, wherein exposure conditions for the photographic printing of the image are determined based on the spectral characteristics of the image sensed by said monochrome CCD after a sensitivity balance of said monochrome CCD is achieved by said cut filter blocking the unnecessary light and by said filter rotation plate restricting transmission of the light quantity.

10. The device of claim 9, wherein the cut filter is housed within the optical lens mechanism.

11. The device of claim 10, wherein the cut filter is tilted against the optical axis.

* * * * *